United States Patent
Brown et al.

(10) Patent No.: US 8,745,032 B1
(45) Date of Patent: Jun. 3, 2014

(54) REJECTING A REQUEST IN A DATABASE SYSTEM

(75) Inventors: Douglas P. Brown, Rancho Santa Fe, CA (US); Anita Richards, San Juan Capistrano, CA (US); Thomas P. Julien, San Diego, CA (US); Louis M. Burger, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 422 days.

(21) Appl. No.: 12/952,561

(22) Filed: Nov. 23, 2010

(51) Int. Cl.
*G06F 7/00* (2006.01)

(52) U.S. Cl.
USPC .......................... 707/713; 707/812; 709/226

(58) Field of Classification Search
USPC ......... 707/713, 715, 716, 718, 719, 720, 721, 707/759, 782, 812, 999.002; 709/226
See application file for complete search history.

(56) References Cited

U.S. PATENT DOCUMENTS

| | | | |
|---|---|---|---|
| 3,648,253 A | 3/1972 | Mullery | |
| 5,473,773 A | 12/1995 | Aman | |
| 5,504,894 A | 4/1996 | Ferguson | |
| 5,537,542 A | 7/1996 | Eilert | |
| 5,675,797 A | 10/1997 | Chung | |
| 6,052,694 A | 4/2000 | Bromberg | |
| 6,339,552 B1 | 1/2002 | Taruishi | |
| 6,353,818 B1 * | 3/2002 | Carino, Jr. ........................... 1/1 |
| 6,718,358 B1 | 4/2004 | Bigus | |
| 6,950,848 B1 | 9/2005 | Yousefi'zadeh | |
| 6,990,667 B2 * | 1/2006 | Ulrich et al. ................. 718/105 |
| 7,124,146 B2 | 10/2006 | Rjaibi | |
| 7,146,353 B2 * | 12/2006 | Garg et al. ............................ 1/1 |
| 7,228,546 B1 * | 6/2007 | McCarthy et al. ............ 718/104 |
| 7,379,953 B2 | 5/2008 | Luo | |
| 7,395,537 B1 | 7/2008 | Brown | |
| 7,657,501 B1 | 2/2010 | Brown | |
| 7,693,847 B1 | 4/2010 | Brown | |
| 7,818,745 B2 | 10/2010 | Snyder | |
| 7,831,592 B2 | 11/2010 | Markl | |
| 8,332,857 B1 | 12/2012 | Brown | |
| 8,516,488 B1 * | 8/2013 | Brown et al. ................. 718/104 |
| 2002/0091746 A1 | 7/2002 | Umberger | |
| 2002/0095301 A1 | 7/2002 | Villena | |
| 2002/0143847 A1 | 10/2002 | Smith | |
| 2002/0194173 A1 | 12/2002 | Bjornson | |
| 2003/0002649 A1 | 1/2003 | Hettish | |
| 2003/0005028 A1 | 1/2003 | Dritschler | |
| 2003/0097443 A1 | 5/2003 | Gillett | |
| 2003/0174651 A1 | 9/2003 | Morton | |
| 2003/0233391 A1 | 12/2003 | Crawford, Jr. | |
| 2004/0021678 A1 | 2/2004 | Ullah | |
| 2004/0117359 A1 | 6/2004 | Snodgrass | |

(Continued)

OTHER PUBLICATIONS

Beyer et al., "Protecting the Quality of Service of Existing Information Systems", Computer Sciences Department, University of Wisconsin, 2003, pp. 1-10.

(Continued)

*Primary Examiner* — Greta Robinson
(74) *Attorney, Agent, or Firm* — Trop, Pruner & Hu P.C.

(57) ABSTRACT

A filter receives a request to perform an operation in a database system, and the filter receives a resource estimate relating to the request from an optimizer. The filter determines whether the resource estimate exceeds an available resource of the database system, and if so, the filter rejects the request prior to execution of the request.

21 Claims, 4 Drawing Sheets

(56) References Cited

U.S. PATENT DOCUMENTS

| | | |
|---|---|---|
| 2004/0225631 A1 | 11/2004 | Elnaffar |
| 2004/0236757 A1 | 11/2004 | Caccavale |
| 2004/0243692 A1 | 12/2004 | Arnold |
| 2005/0010558 A1 | 1/2005 | Dettinger |
| 2005/0038789 A1 | 2/2005 | Chidambaran |
| 2005/0038833 A1 | 2/2005 | Colrain |
| 2005/0039183 A1 | 2/2005 | Romero |
| 2005/0066326 A1 | 3/2005 | Herbeck |
| 2005/0071307 A1 | 3/2005 | Snyder |
| 2005/0081210 A1 | 4/2005 | Day |
| 2005/0125213 A1 | 6/2005 | Chen |
| 2005/0192937 A1 | 9/2005 | Barsness |
| 2005/0262183 A1 | 11/2005 | Colrain |
| 2005/0278381 A1 | 12/2005 | Diao |
| 2006/0026179 A1 | 2/2006 | Brown |
| 2006/0149695 A1 | 7/2006 | Bossman |
| 2007/0100793 A1 | 5/2007 | Brown |
| 2007/0162426 A1 | 7/2007 | Brown |
| 2008/0010240 A1* | 1/2008 | Zait .................................. 707/2 |
| 2008/0052720 A1 | 2/2008 | Barsness |
| 2008/0071759 A1 | 3/2008 | Santosuosso |
| 2008/0133447 A1 | 6/2008 | Barsness |
| 2008/0133454 A1 | 6/2008 | Markl |
| 2008/0162417 A1 | 7/2008 | Morris |
| 2008/0162418 A1 | 7/2008 | Morris |
| 2008/0162419 A1 | 7/2008 | Brown |
| 2008/0162583 A1 | 7/2008 | Brown |
| 2008/0172419 A1 | 7/2008 | Richards |
| 2008/0306950 A1* | 12/2008 | Richards et al. ................... 707/8 |
| 2010/0281285 A1 | 11/2010 | Blanding |
| 2011/0270822 A1* | 11/2011 | Denton et al. ................. 707/719 |
| 2012/0054175 A1* | 3/2012 | Barsness et al. .............. 707/719 |

OTHER PUBLICATIONS

Nikolaou et al., "Transaction Routing for Distributed OLTP Systems: Survey and Recent Results", Department of Computer Science, University of Crete and Institute of Computer Science, 2002, pp. 1-26.

Sinnwell et al., "Managing Distributed Memory to Meet Multiclass Workload Response Time Goals", Department of Computer Science, University of the Saarland, 2002, pp. 1-8.

Oracle, "Oracle9i Database Resoruce Manager", Technical Whitepaper, 2001, pp. 1-11.

Finkelstein, Computer Science Department, Stanford University, "Common Expression Analysis in Database Applications," 1982, pp. 235-245.

Sellis, University of California, Berkeley, "Multiple-Query Optimization," ACM Transactions on Database Systems, vol. 13, No. 1, Mar. 1988, pp. 23-52.

Brown et al., U.S. Appl. No. 12/317,836 entitled "Database System Having a Service Level Goal Responsive Regulator" filed Dec. 30, 2008 (24 pages).

Brown et al., U.S. Appl. No. 12/317,985 entitled "Database System Having Regulator That Performs Workload Regulation Based on Optimizer Estimates" filed Dec. 30, 2008 (26 pages).

Brown et al., U.S. Appl. No. 12/482,780 entitled "Database System Having a Regulator to Provide Feedback Statistics to an Optimizer" filed Jun. 11, 2009 (33 pages).

Burger et al., U.S. Appl. No. 12/908,052 entitled "Generating an Integrated Execution Plan for Multiple Database Requests" filed Oct. 20, 2010 (34 pages).

Brown et al., U.S. Appl. No. 12/942,466 entitled "Adjusting a Resource Estimate in Response to Progress of Execution of a Request" filed Nov. 9, 2010 (36 pages).

Richards et al., U.S. Appl. No. 12/942,480 entitled "Managing Execution of Requests Using Information Relating to a Job" filed Nov. 9, 2010 (42 pages).

Richards et al., U.S. Appl. No. 12/945,072 entitled "Calculating a Throttle Limit for Requests in a Database System" filed Nov. 12, 2010 (44 pages).

Brown et al., U.S. Appl. No. 12/945,064 entitled "Calculating Priority Indicators for Requests in a Queue" filed Nov. 12, 2010 (41 pages).

Douglas P. Brown et al., U.S. Appl. No. 12/942,466 entitled Adjusting a Resource Estimate in Response to Progress of Execution of a Request filed Nov. 9, 2010 (36 pages).

Douglas P. Brown et al., U.S. Appl. No. 12/945,064 entitled Calculating Priority Indicators for Requests in a Queue filed Nov. 12, 2010 (41 pages).

Liu et al., Scheduling Algorithms for Multiprogramming in a Hard-Real-Time Environment, J. ACM 20, 1 (Jan. 1973), pp. 46-61.

* cited by examiner

REJECTING A REQUEST IN A DATABASE SYSTEM

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

As database systems have increased in size and complexity, it has become more challenging to efficiently implement operational and management tasks in the database systems.

SUMMARY

In general, a filter receives a request to perform an operation in a database system, and the filter receives a resource estimate relating to the request from an optimizer. The filter determines whether the resource estimate exceeds an available resource of the database system, and if so, the filter rejects the request prior to execution of the request.

Other or alternative features will become apparent from the following description, from the drawings, and from the claims.

BRIEF DESCRIPTION OF THE DRAWINGS

Some embodiments are described with respect to the following figures.

DETAILED DESCRIPTION

In a relatively large database system, there can be many requests submitted to the database system that can cause corresponding database operations to be performed, including read operations, write operations, sort operations, join operations, and so forth. Inefficient requests, such as queries that are poorly written, can quickly over-consume available resources of the database system, which can cause the resources of the database system to be unavailable for other requests.

Typical workload management techniques do not efficiently or effectively recognize, prior to execution of any particular request, that the particular request can take up and inordinate amount of the database system's resources, which can cause execution of other requests to suffer. The impact of failing to recognize and reject requests that can over-consume resources of the database system can result in poor or inconsistent response times to users of the database system. For example, a user who submits a particular query during off-peak times, such as during the evenings or on weekends, can experience a satisfactory response time. However, the user submitting the same query during peak times may experience unsatisfactory response times, since the query would have to compete for resources with other requests.

The term "request" can refer to a database query (e.g., Structured Query Language or SQL query) that is processed by the database system to produce an output result. Alternatively, a "request" can refer to a utility, such as a load utility to perform loading of data from a source to a target. More generally, a "request" refers to any command or group of commands that can be submitted to the database system for performing predefined data access (read or write) tasks, or to perform creation or modifications of database structures such as tables, views, etc. A request can belong to one of multiple possible workloads in the database system.

A "workload" (or alternatively "workload group") is a set of requests that have common characteristics, such as an application that issued the requests, a source of the requests, type of query, priority, response time goals, throughput, and so forth. A workload group is defined by a workload definition, which defines characteristics of the workload group as well as various rules associated with the workload group.

Figure 1:
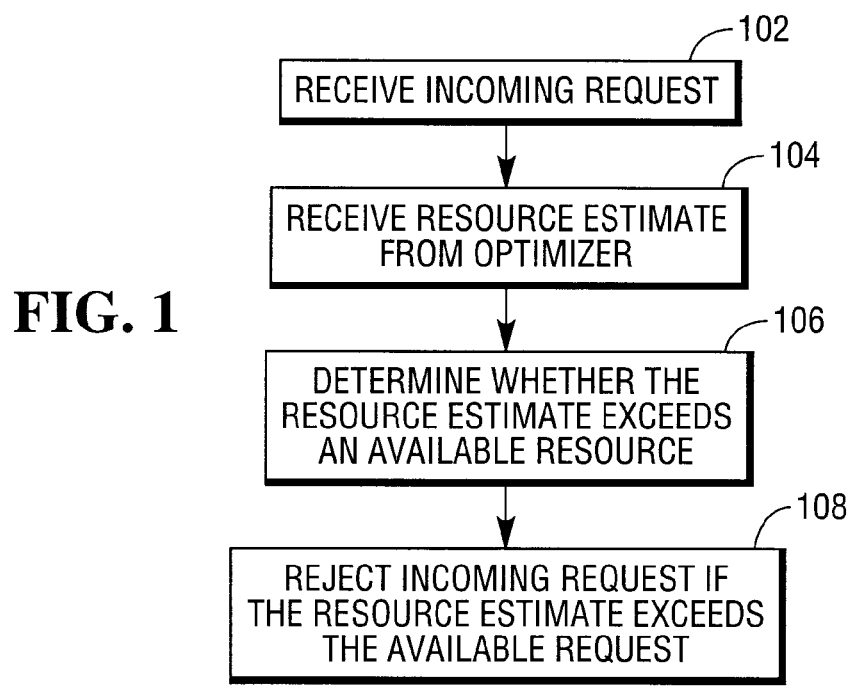
FIG. 1 is a flow diagram of a procedure according to some embodiments.

In accordance with some embodiments, a workload management subsystem is provided in a database system to dynamically reject requests (prior to execution of such requests) based on estimated resource requirements of the request and based on available resources of the database system. As generally depicted in FIG. 1, an incoming request to perform an operation in the database system is received (at 102). The workload management subsystem also receives (at 104) a resource estimate (estimate of an amount of a database system resource required) of the incoming request. In some implementations, the resource estimate can be provided by an optimizer of the database system.

In response to receipt of the incoming request, the workload management subsystem determines (at 106) whether the resource estimate for the incoming request will exceed an available resource of the database system. A resource estimate exceeds an available resource if the amount of the resource available for the incoming request would not be able to satisfy the requirement for the resource as reflected in the resource estimate. If the resource estimate exceeds the available resource of the database system, then the workload management subsystem rejects (at 108) the incoming request, such that the incoming request is not submitted for execution in the database system. Note that the rejection of the incoming request is performed prior to execution of the incoming request.

The resource estimates (costs) provided by the optimizer can be time estimates to provide an estimate of an expected amount of time for corresponding requests to complete. In addition, the resource estimates provided by the optimizer can be estimates of usage of other resources of the database system, including as examples, an estimate of usage of a processor resource, an estimate of usage of an input/output (I/O) resource, an estimate of usage of a network resource, and/or an estimate of usage of a memory resource. The estimate of usage of the processor resource can indicate the expected number of cycles of one or more CPUs that execution of a request is expected to consume. The estimate of usage of the I/O resource can indicate the expected number of I/O accesses (e.g., read or write accesses of disk storage, for example) that execution of the request is expected to invoke. An I/O resource can be a physical I/O resource (e.g., megabits per second for a physical storage device) or a logical I/O resource (e.g., logical blocks per second, where a logical block refers to some predefined amount of data used by a data access subsystem such as a file system and the like). The estimate of usage of the network resource can indicate an amount of network traffic (such as traffic between different computer nodes) that is expected in the execution of the request. The estimate of usage of the memory resource can indicate an amount of memory to be used for storing data for the request.

The estimate of usage of resources can be an aggregate (e.g., sum) of resources expected to be consumed by all of the steps of a request. Alternatively, the estimate of usage of resources can be for an individual step of the steps of the request. In the latter case, if a request contains any individual step (out of multiple steps) of a particular type (e.g., an individual step involving a product join) that has an estimated resource usage (e.g., CPU or I/O resource usage) that exceeds an available resource in the database system, then the request can be rejected.

Figure 2:
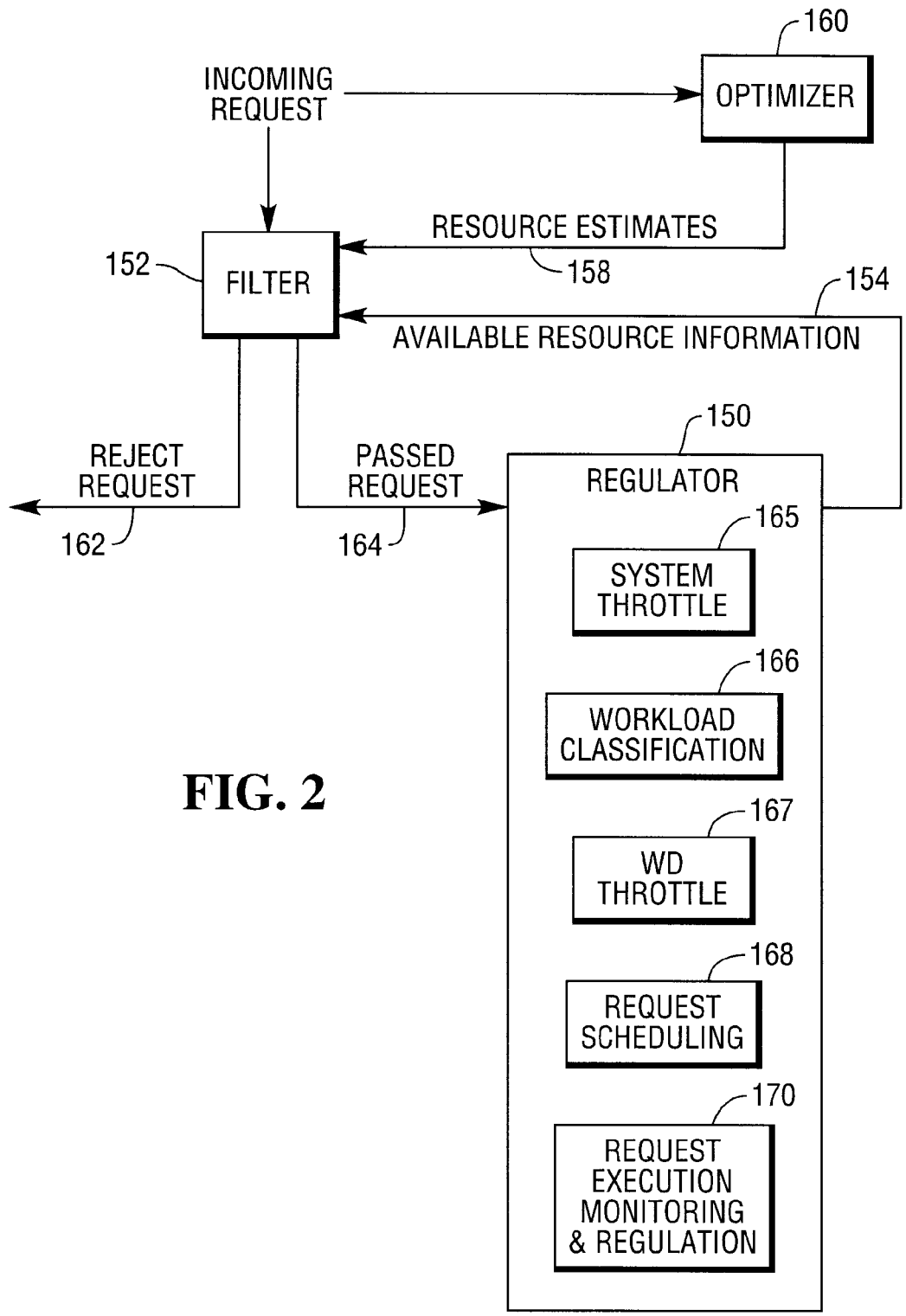
FIG. 2 is a block diagram of example components in a database system, according to some embodiments.

FIG. 2 is a block diagram depicting certain components of a database system according to some embodiments. An incoming request is received by a filter 152 of the database system. The filter 152 receives available resource information 154 from a regulator 150, and receives resource estimates 158 from an optimizer 160. The regulator 150 is configured to monitor execution of a request and to adjust priority settings of the request during execution based on monitored progress information. Adjusting request priority settings (or priority levels) modifies the way shared resources are allocated among the requests, where the shared resources can include one or more of the following: CPU (central processing unit), disk-based storage (e.g., magnetic or optical disk storage), memory, queue, cache, and network resources.

As part of its operation, the regulator 150 also collects actual statistics (e.g., elapsed time, usage of processing resources, usage of (physical or logical) I/O resources, usage of storage resources, usage of network resources, usage of memory resources, and other statistics). The actual statistics regarding usage of database system resources can be used to determine the available resources of the database system for the requests. The available resource information is provided as 154 from the regulator 150 to the filter 152.

Based on the resource estimates (158) and available resource information (154), the filter 152 can either reject an incoming request (by sending a Reject Request indication (162) back to the requestor), or to accept the incoming request, by passing the request (164) to the regulator 150. As noted above, rejection of an incoming request is based on a determination that a resource estimate from the optimizer 160 exceeds a corresponding available resource of the database system. For example, if the estimated resource consumption requirement for the incoming request is 10 million CPU (central processing unit) seconds and one billion I/Os, and the database system currently has just one million CPU seconds available at the time of arrival of the incoming request, then the filter 152 can reject the incoming request. Rejection of the incoming request means that the request is not passed to the regulator 150, such that the database system will not schedule such rejected incoming request for execution. The requestor would have to re-submit the rejected request again at a later point in time.

The requestor can be a user of the database system, or an application that is able to submit requests to the database system.

The request (164) that is passed to the regulator 150 is processed by the regulator 150, where the processing includes applying a system throttle 165, performing workload classification 166, applying a workload definition (WD) throttle 167, performing request scheduling 168, and performing request execution monitoring and regulation 170. Tasks 166, 168, and 170 are discussed in further detail in connection with FIG. 4, below.

The application of the system throttle 165 and WD throttle 167 can be considered additional layers of filtering (in addition to the filtering performed by the filter 152). The system throttle 165 can be considered a high-level (system) limit on the number of requests associated with a particular source. For example, there can be a high-level limit of N (N>1) requests associated with a particular customer identifier—in other words, there can be no more than N requests outstanding at the same time from users associated with the customer identified by the particular customer identifier. Any excessive requests (requests that cause the total number of requests from the particular source to exceed N requests) will be rejected. Alternatively, the excessive requests can be delayed by providing such excessive requests into a system queue.

After workload classification (166) in which a request is classified into one of several workloads, the regulator 150 can apply the WD throttle (167). The WD throttle filters requests based on concurrency levels for different workloads. The regulator 150 monitors the concurrency levels of the respective workloads, and if the concurrency level of the corresponding workload (that the incoming request is assigned to) is above a respective predefined concurrency limit (which can be different for the different workloads), then the corresponding incoming request for that workload can either be rejected or placed into a delay queue for later execution (when the concurrency level for the corresponding workload subsides below the predefined concurrency limit).

Note that in different implementations, the system throttle 165 and/or WD throttle 167 can be omitted.

Figure 3:
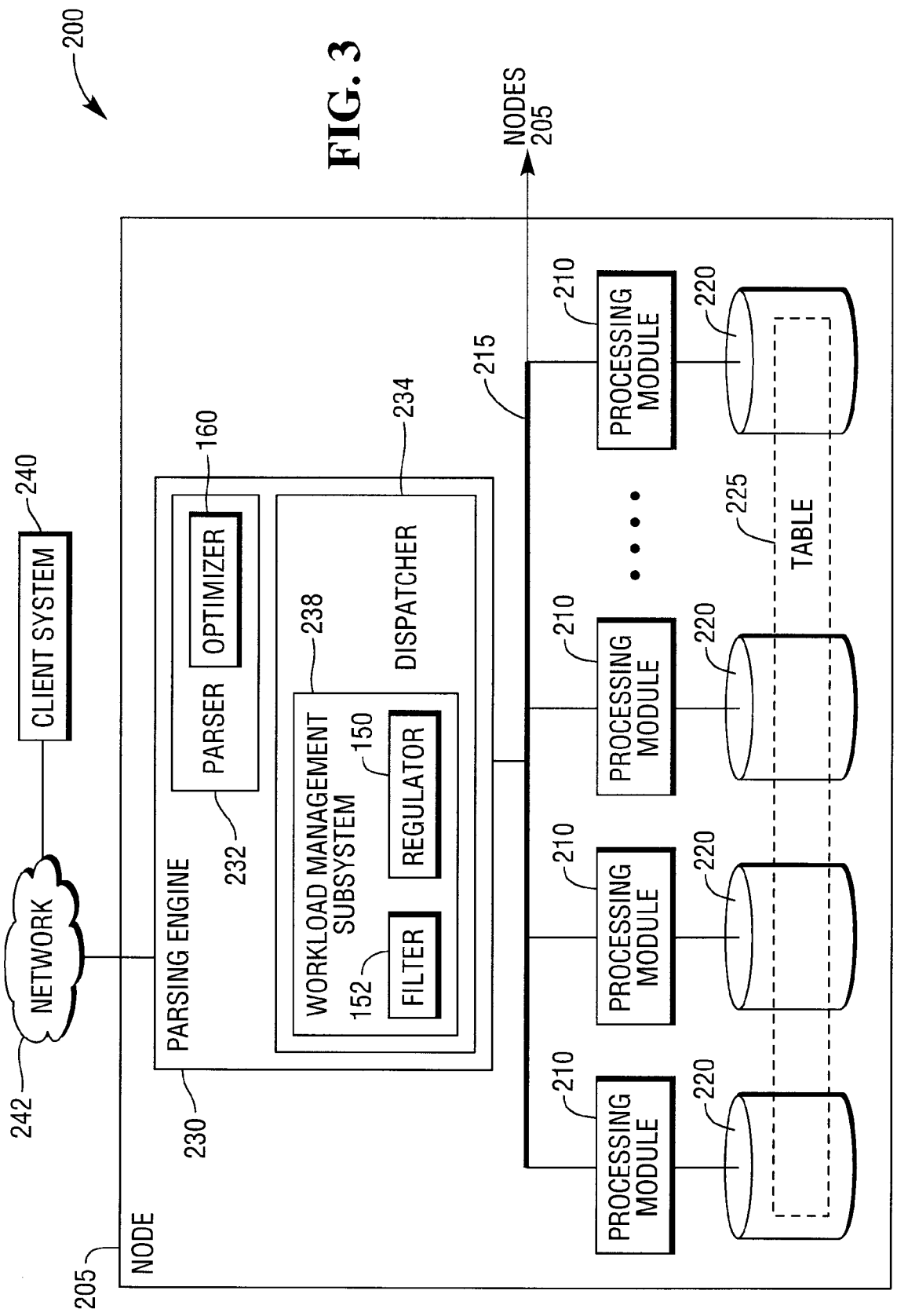
FIG. 3 is a block diagram of an example arrangement that includes a database system having a workload management subsystem according to some embodiments.

FIG. 3 illustrates an example database system 200 that can incorporate some embodiments of the invention. The database system 200 can include multiple computer nodes 205 (just one node depicted in FIG. 3). Each node 205 includes one or more processing modules 210 connected to a network 215. The processing modules 210 manage the storage and retrieval of data in respective data storage facilities 220. Each of the processing modules 210 may be one or more physical processors or may be a virtual processor, with one or more virtual processors running on one or more physical processors.

Each processing module 210 manages a portion of a database that is stored in a corresponding one of the data storage facilities 220. Each data storage facility 220 includes one or more disk drives or other types of storage devices. The nodes 205 of the database system are interconnected by the network 215.

As depicted in FIG. 3, a table 225 is distributed across the data storage facilities 220, where different rows of the table 225 can be distributed across the data storage facilities. In response to a request, one or more of the processing modules 210 can be instructed to retrieve corresponding rows from the table 225 to provide a result to the requestor.

The node 205 also includes a parsing engine 230, which has a parser 232 and a dispatcher 234. The parser 232 receives database requests (such as those submitted by client systems 240 over a network 242) or from another source, parses each received request, and generates executable steps for the parsed request. The parser 232 includes the optimizer 160 that generates query plans (also referred to as execution plans) in response to a request, selecting the most efficient from among the plural query plans. As noted above, the optimizer 160 can also produce resource estimates for the query plan.

The dispatcher 234 sends the executable steps of the query plan generated by the parser 232 to one or multiple processing modules 210 in the node 205. The processing modules 210 execute the steps. If the request specifies retrieval of data from the table 225, then the retrieved data is sent back by the database system 200 to the requestor for storage or display. Alternatively, the request can specify a modification of the table (adding data, changing data, and/or deleting data in the table 225).

The dispatcher 234 includes a workload management subsystem 238 according to some embodiments. Note that parts of the workload management subsystem 238 can also be in the processing modules 210 (not depicted), since the workload management subsystem 238 also monitors execution of requests. The workload management subsystem 238 includes the regulator 150 and filter 152 discussed above.

In embodiments with multiple parsing engines 230, each parsing engine can have a corresponding parser and/or workload management subsystem.

Operations of various components discussed above are illustrated in more detail in FIG. 4. As discussed above, an incoming request is received by the filter 152, which decides whether to reject the incoming request or accept the request, based on resource estimates (158) from the optimizer 160, and available resource information (154) from the regulator 150.

Note that the incoming request is also optimized by the optimizer 160. In generating query plans and selecting an optimal one of the query plans for submission to the processing modules 210 for execution, the optimizer 160 can generate an estimate of the response time (elapsed time) that provides an indication of how long the request should execute in the database system. Note that estimates can also be generated for every individual step of the request, and a sum of the estimates for the individual steps provides the estimate of the entire request. Moreover, in accordance with some embodiments, the optimizer 136 can generate other resource estimates, including estimates of processor usage, I/O resource usage, network resource usage, memory resource usage, etc., for each step of the request.

The optimizer 160 can produce the estimates of processor usage, I/O usage, network usage, and memory usage based on a cost model. For example, the optimizer 160 can retrieve information relating to the processor capacity, which can be expressed in terms of millions of instructions per second (MIPS). Also, the optimizer 160, as part of its normal optimization tasks, can estimate the cardinalities of tables and intermediate spool files that are involved in execution of the request. Based on the estimated cardinalities and the processor capacity, the optimizer 160 is able to estimate the processor usage that is expected for execution of the request. The processor usage estimate can be performed on a per-step basis for each step of the query plan. Note that different steps can access different tables or different parts of tables across different access modules in the system.

Similarly, the optimizer 160 can also retrieve information regarding memory size (size of high-speed memory that can be used to temporarily store data). Based on the memory size and the expected accesses of data in base tables and intermediate tables that will be involved in each step of a query plan, the optimizer 160 is able to estimate the expected I/O usage for each step. The I/O usage includes I/O accesses of disk storage (e.g., the number of block I/Os to read from or write to a table or index).

Moreover, the optimizer 160 is able to determine which data-storage facilities 220 store data involved in the execution of the request. For each step of the query plan, the optimizer 136 is able to estimate how much inter-processor module or inter-node traffic is expected—this will allow the optimizer 136 to estimate the network usage (usage of the network 215 of FIG. 3) is expected for each step.

Based on the resource estimates (response time estimate and/or processor usage, I/O usage, network usage, memory usage, table cardinality and/or spool size estimates), and/or based on other classification criteria for a respective workload, the workload management subsystem 238 assigns (at 304) the request to one of multiple workload groups that have been defined. Task 304 corresponds to the workload classification task 166 depicted in FIG. 2.

The assignment (304) is based on accessing workload group rules 305 (as defined by workload definitions) to match characteristics of the request as identified by the optimizer 160 with various workload definition rules. The workload group corresponding to the workload definition rules most closely matching the characteristics of the request is identified, where the incoming request is assigned to the identified workload group.

Next, the regulator 150 performs request scheduling (at 306), which corresponds to tasks 167 and 168 in FIG. 2. In request scheduling (306), the regulator 150 determines whether or not an incoming request is to be immediately scheduled for execution or whether the incoming request should be held for later execution. As part of the request scheduling performed at 306, the regulator 150 can also apply the WD throttle 167 discussed above in connection with FIG. 2. If the concurrency level of a corresponding workload exceeds a predefined concurrency limit, then the incoming request can be rejected, or alternatively, be placed into a delay queue (305) for later execution when the concurrency level for this workload subsides below the predefined concurrency limit.

If an incoming request can be scheduled for immediate execution, the regulator 150 places (at 308) the incoming request into one of multiple workload group buckets 310 (as defined by corresponding workload definitions). The "buckets" 310 can be execution queues that contain requests scheduled for execution.

Next, the regulator 150 performs SLG (service level goal)-responsive regulation (at 312) at the request level. The regulator 150 selects a request from one of the buckets 310, in an order determined by priorities associated with the workload groups, and executes (314) the selected request.

In accordance with some implementations, the SLG-responsive regulation task 312 performed by the regulator 150 includes recalibrating resource estimates, as well as adjusting priority settings for an individual request based on the recalibrated resource estimates in an attempt to meet the SLG associated with the request.

An "SLG" or "service level goal" refers to a predefined set of one or more performance criteria that are to be satisfied during execution of a request. The SLG can be defined by a database administrator, for example. In some examples, an SLG can be any one or more of the following: a target response time; a target throughput; an enforcement policy (to specify that some percentage of queries are to finish in some predefined amount of time), and so forth. In a more specific example, the SLG for requests of a particular workload group can be "≤1 second @ 95," which means that each such request should execute within one second 95% of the time. Another example SLG can be "1,000 queries per hour." An SLG can be defined for a request individually. Alternatively, an SLG can be defined for a workload group that has a number of requests.

In some implementations, prior to execution of the request selected from the workgroup buckets 310, the regulator 160 (in task 312) can determine if, given the resource estimates from the optimizer for the request, that the SLG of the request cannot be satisfied. If this is the case, the request can be rejected or delayed.

As further depicted in FIG. 3, an SLG-responsive resource monitor 316 includes a regulator feedback detection and adjustment module 324, which performs feedback detection and dynamic resource adjustment. The module 324 receives progress information (315) from the SLG-response regulation task 312, where the progress information 315 is reported based on monitoring execution of the request.

The regulator feedback and detection adjustment module 324 is able to consider, at each step of the query plan associated with the request, whether the progress information for execution of the request so far that is received from the SLG-responsive regulation task 312 is consistent with the current resource estimates provided for the respective steps of the query plan. The progress information 315 can indicate whether or not the current resource estimates are inadequate (actual usage exceeds estimated resource usage) or excessive (actual usage less than estimated resource usage). If recalibration of resource estimates is needed based on comparing the progress information 315 to the current resource estimates, respective resource estimates can be adjusted.

Based on the re-calibrated resource estimates, the regulator feedback detection and adjustment module 324 can provide priority level adjustments (326) to the SLG-responsive regulation task 312. In response to the priority level adjustments (326), the SLG-responsive regulation task 312 adjusts priority settings accordingly to adjust priority settings for the remaining steps of the query plan.

The SLG-responsive resource monitor 316 also includes a system feedback module 330 that collects run-time statistics of the database system as a result of execution of requests. Based on the run-time statistics, the system feedback module 330 provides available resource information (154) back to the filter 152 to allow the filter to know the available resource of the database system, so that the filter 152 can dynamically reject any incoming request if warranted.

Figure 4:
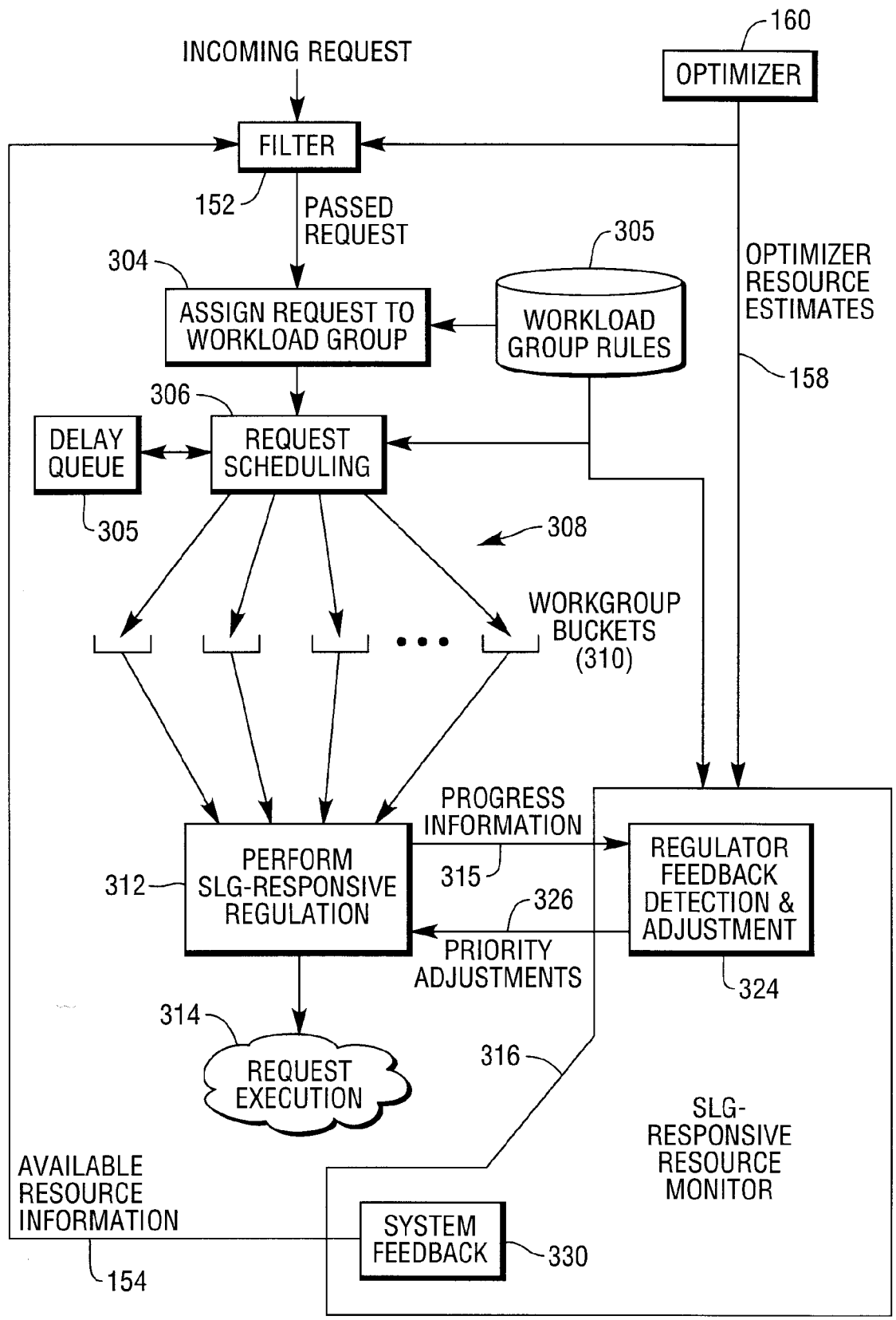
FIG. 4 illustrates a workload management architecture according with some embodiments.

As depicted in FIG. 4, the dynamic rejection of an incoming request as performed by the filter 152 occurs prior to the request being subjected to various operations of the regulator 150, including operations 166, 168, 170 (FIG. 2) and operations 304, 306, 308, 312, and 316 (FIG. 4) being performed. By being able to dynamically reject an incoming request, the overall load of the database system can be better managed such that the likelihood of over-use of resources is reduced.

Machine-readable instructions of the various components described above (including those depicted in FIGS. 2-4) are loaded for execution on a processor. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method for use in a database system, comprising:
   receiving, by a filter executing on at least one processor, an incoming request to perform an operation in the database system;
   receiving, by the filter from an optimizer, a resource estimate relating to the incoming request;
   determining, by the filter, whether the resource estimate exceeds an available resource of the database system;
   in response to determining that the resource estimate exceeds the available resource of the database system, the filter rejecting the incoming request prior to execution of the incoming request in the database system;
   monitoring, by a regulator executing on the at least one processor, execution of requests in the database system; and
   in response to determining that the resource estimate does not exceed the available resource of the database system, allowing the incoming request to execute, and adjusting, by the regulator, a priority setting of the incoming request during execution of the incoming request based on the monitored execution and the resource estimate.

2. The method of claim 1, wherein receiving the resource estimate comprises receiving the resource estimate for an individual step of plural steps associated with the incoming request, and wherein the filter rejecting the incoming request is based on the resource estimate for the individual step exceeding the available resource of the database system.

3. The method of claim 1, further comprising:
   assigning the incoming request to a workload group from among a plurality of workload groups,
   wherein the determining and rejecting are performed by the filter prior to the assigning being performed.

4. The method of claim 3, further comprising:
   after the assigning, identifying a service level goal (SLG) for the incoming request;
   determining, by the regulator, whether the SLG can be satisfied based on the resource estimate; and
   rejecting or delaying, by the regulator, the incoming request in response to determining that the SLG cannot be satisfied.

5. The method of claim 4, wherein identifying the SLG is based on information associated with the assigned workload group.

6. The method of claim 3, further comprising:
   determining whether a concurrency level of the workload group to which the incoming request is assigned exceeds a concurrency limit; and
   in response to determining that the concurrency limit is exceeded, rejecting or delaying the incoming request.

7. The method of claim 1, further comprising:
determining whether the incoming request causes a system limit associated with requests from a particular source to be exceeded; and
in response to determining that the system limit is exceeded, rejecting or delaying the incoming request.

8. The method of claim 1, wherein the resource estimate from the optimizer is selected from the group consisting of an estimate of usage of a processor resource, an estimate of usage of an input/output resource, an estimate of usage of a network resource, and an estimate of usage of a memory resource.

9. The method of claim 8, wherein the estimate of usage of the processor resource comprises an estimate of usage of one or more central processing units (CPUs) provided in one or more computer nodes of the database system, wherein the estimate of usage of the input/output resource comprises an estimate of a number of accesses of a disk-based storage, wherein the estimate of usage of the network resource comprises an estimate of an amount of data to be communicated over a network between processing modules of the database system, and wherein the estimate of usage of the memory resource comprises an estimate of an amount of memory to be used.

10. The method of claim 1, further comprising:
based on the monitoring, the regulator providing information relating to the available resource for use by the filter.

11. The method of claim 1, wherein allowing the incoming request to execute comprises the filter passing the incoming request to the regulator, and wherein after passing the request to the regulator, the regulator:
identifying a service level goal (SLG) of the incoming request,
wherein adjusting the priority setting of the incoming request is performed to cause the execution of the incoming request to meet the SLG.

12. A database system comprising:
at least one processor;
an optimizer executable on the at least one processor to generate an execution plan for an incoming request and to generate a resource estimate for the incoming request;
a filter executable on the at least one processor to:
receive information relating to an available resource of the database system;
determine if the resource estimate exceeds the available resource;
reject the incoming request, prior to execution of the incoming request, in response to determining that the resource estimate exceeds the available resource; and
in response to determining that the resource estimate does not exceed the available resource of the database system, allow the incoming request to execute; and
a regulator executable on the at least one processor to:
monitor execution of requests in the database system, and
adjust, during execution of the incoming request based on the monitored execution and the resource estimate, a priority setting of the incoming request that is allowed to execute in response to determining that the resource estimate does not exceed the available resource of the database system.

13. The database system of claim 12, wherein the regulator is executable to further assign the incoming request to a workload group from among plural workload groups,
wherein the filter is executable to reject the incoming request prior to the regulator assigning the incoming request to the workload group.

14. The database system of claim 13, wherein the filter is executable to allow the incoming request to be passed to the regulator in response to determining that the resource estimate does not exceed the available resource.

15. The database system of claim 14, wherein the regulator is executable to:
schedule the incoming request for execution.

16. The database system of claim 15, wherein the regulator is executable to further:
modify the resource estimate for the incoming request based on the monitored execution.

17. The database system of claim 12, wherein the resource estimate from the optimizer is selected from the group consisting of an estimate of usage of a processor resource, an estimate of usage of an input/output resource, an estimate of usage of a network resource, and an estimate of usage of a memory resource.

18. An article comprising at least one machine-readable storage medium storing instructions that upon execution cause a database system having a processor to:
receive, by a filter, an incoming request to perform an operation in the database system;
receive, by the filter from an optimizer, a resource estimate relating to the incoming request;
determine, by the filter, whether the resource estimate exceeds an available resource of the database system;
in response to determining that the resource estimate exceeds the available resource of the database system, reject, by the filter, the incoming request prior to execution of the incoming request in the database system;
monitor by a regulator, execution of requests in the database system; and
in response to determining that the resource estimate does not exceed the available resource of the database system, allow, by the filter, the incoming request to execute, and adjust, by the regulator, a priority setting of the incoming request during execution of the incoming request based on the monitored execution and the resource estimate.

19. The article of claim 18, wherein the instructions upon execution cause the database system to further:
regulate, by the regulator, execution of the incoming request to meet a service level goal of the incoming request.

20. The article of claim 19, wherein the instructions upon execution cause the database system to further:
assign, by the regulator, the incoming request to a workload group from among multiple workload groups,
wherein rejecting the incoming request occurs before the assigning.

21. The article of claim 18, wherein the resource estimate from the optimizer is selected from the group consisting of an estimate of usage of a processor resource, an estimate of usage of an input/output resource, an estimate of usage of a network resource, and an estimate of usage of a memory resource.

* * * * *